(12) United States Patent
Affoneh et al.

(10) Patent No.: US 9,336,017 B2
(45) Date of Patent: May 10, 2016

(54) EFFICIENT COMMAND PROCESSING (71) Applicant: VMware, Inc., Palo Alto, CA (US)

(72) Inventors: Jehad Affoneh, Redmond, WA (US); Andrey Belokrylov, Redmond, WA (US)

(73) Assignee: VMware, Inc., Palo Alto, CA (US)

( * ) Notice: Subject to any disclaimer, the term of this patent is extended or adjusted under 35 U.S.C. 154(b) by 273 days.

(21) Appl. No.: 14/027,020

(22) Filed: Sep. 13, 2013

(65) Prior Publication Data
US 2015/0082218 A1 Mar. 19, 2015

(51) Int. Cl.
G06F 3/048 (2013.01)
G06F 9/44 (2006.01)
G06F 3/0484 (2013.01)

(52) U.S. Cl.
CPC ............ *G06F 9/4443* (2013.01); *G06F 3/0484* (2013.01)

(58) Field of Classification Search
CPC .................................................... G06F 3/0484
USPC ........................................................ 715/771
See application file for complete search history.

(56) References Cited

U.S. PATENT DOCUMENTS

| | | | |
|---|---|---|---|
| 7,885,843 B2 * | 2/2011 | Chatterjee et al. | |
| 2011/0178995 A1 * | 7/2011 | Suchter et al. | 707/692 |
| 2013/0041878 A1 * | 2/2013 | Satyanarayana et al. | 707/706 |
| 2014/0129961 A1 * | 5/2014 | Zubarev et al. | 715/752 |
| 2014/0208253 A1 * | 7/2014 | Pettus | G06F 3/04847 715/772 |
| 2014/0281889 A1 * | 9/2014 | Treibach-Heck | 715/234 |
| 2014/0282037 A1 * | 9/2014 | Narasimhan | G06Q 30/0631 715/738 |
| 2014/0359509 A1 * | 12/2014 | Baran | 715/771 |

OTHER PUBLICATIONS

Alfred App—Productivity App for Mac OS X, downloaded on Sep. 11, 2013 at: http://www.alfredapp.com/, 7 pages.

* cited by examiner

*Primary Examiner* — William Titcomb (57) ABSTRACT

Exemplary methods, apparatuses, and systems receive input command requests and present suggestions for command actions or command objects. An action request is received within a datacenter management user interface and a first command suggestion is provided. The first command suggestion includes one or more placeholder object categories. A first suggested object is identified according to a received object property and the action request. The object property can be CPU utilization, disk space, memory, uptime, version, software type, geographic location, keyword, or name. In response to receiving the action request, the first suggested object is determined to be compatible with the action request. In response to identifying the first suggested object is compatible with the received object property and the action request, a second command suggestion is provided. The second command suggestion includes the first suggested object.

20 Claims, 7 Drawing Sheets

EFFICIENT COMMAND PROCESSING

FIELD OF THE INVENTION

The various embodiments described herein relate to efficient command processing. More specifically, embodiments described herein relate to data processing system infrastructure management, and command suggestions.

BACKGROUND OF THE INVENTION

Server and network system administrators often use program interfaces that require multiple and repeated manual entry of commands. To perform routine everyday tasks, multiple navigation requests may be sent within a number of individual user interfaces or contexts. For example, a system administrator may traverse a visual representation of each of many remote systems in order to obtain system details for specific hosts or machines. To navigate to a virtual machine an administrator might use a proprietary browser to search/navigate through parts of a datacenter or networked system to find a status of a target virtual machine. The proprietary browser may first receive a listing of all hosts in the datacenter, and then prompt the administrator to scroll through a number of the virtual machines in one or more hosts before ultimately navigating to the target virtual machine.

Once navigation and status determination of the target virtual machine is complete, the administrator may have to switch context (e.g., select a different user interface component, different tool, or open an entirely different program) to initiate maintenance or system changes on the respective virtual machine. For example, to migrate a virtual machine to a different host may require separately determining a number of characteristics (e.g., disk space, processor availability, geographic location, software versions, etc.) about the virtual machine or source host and then determining characteristics of the target host.

Actions or commands incorporating multiple objects may require tedious repetition in navigating through one or more datacenters using a variety of different tools or programs to gather status or data on each of the objects. For example, to gather data or characteristics from multiple hosts in order to properly setup a migration may require numerous context switches in between programs or between user interface components of a single program. Upon gathering the status or data of each object, a user may then switch contexts to perform the action or command in another program or application. Routine tasks such as server migrations or system status checks can be slowed down by the many small delays in requesting data for each object in an infrastructure tree. Populating details for each object may load unnecessary or unrelated status or summary information of each object state. A system administrator may be interested in details of only the target object, and may be needlessly hampered by repeated status queries performed along the route to navigating to a target. These repeated and unnecessary status queries create a load for the server to process, which may slow down processing of valuable queries coming from one or more concurrent users. Navigation programs may request varying levels of detail for each object in a system, and even small amounts of extraneous requested details add up to larger productivity delays. Such inflexible command interfaces can incur unnecessary overhead that is compounded for frequently occurring administration tasks.

SUMMARY OF THE INVENTION

Exemplary methods, apparatuses, and systems receive requests and present command suggestions. An action request is received within a datacenter management user interface and a first command suggestion is provided. In response to receiving the action request, a first suggested object determined to be compatible with the action request is provided. The first suggested object is a datacenter or a component within the datacenter and the component may be physical or virtual. The first suggested object is not displayed as a directly selectable option within the context of a datacenter management user interface at the time the action request is received. In response to determining the first suggested object compatible with the action request, a first command suggestion within the datacenter management user interface is provided.

In one embodiment, the first command suggestion includes a placeholder that signifies an object category or parameter type. Additionally, a first suggested object may be identified according to a received object property and the action request. Exemplary object properties include CPU utilization, disk space, memory, uptime, version, software type, geographic location, keyword, and/or name. In response to identifying the first suggested object is compatible with the received object property and the action request, a second command suggestion is provided. The second command suggestion includes the first suggested object.

Other features and advantages will be apparent from the accompanying drawings and from the detailed description.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

Various embodiments and aspects of the inventions will be described with reference to details discussed below, and the accompanying drawings will illustrate the various embodiments. The following description and drawings are illustrative of the inventions and are not to be construed as limiting the inventions. Numerous specific details are described to provide a thorough understanding of various embodiments of the present inventions. However, in certain instances, well-known or conventional details are not described in order to provide a concise discussion of embodiments of the present inventions.

Embodiments described herein relate generally to Efficient Command Processing (ECP). ECP receives action requests and outputs command suggestions. The command suggestion may include one or more object suggestions (e.g., specific objects or object categories) or another parameter or parameter type (e.g., units of measure, VM version, OS type, chip architecture type, network type, data store type, whether fault tolerance is enabled or disabled, or any other parameters that may be necessary to configure or re-configure one or more objects). In one embodiment, the object may be a physical or virtual data processing system infrastructure component (e.g., a datacenter, cluster, host, data store, or virtual machine).

In some embodiments, ECP provides an object category or parameter type placeholder as part of a command suggestion. As used herein, the term "provide" refers to displaying, prompting, messaging, or otherwise presenting a user with something (e.g., a suggestion, specific action/or object, error message, etc.). ECP prompts a user to replace the placeholder with one or more unique objects or parameters. ECP receives a portion of a target object's properties to provide unique object suggestions as a replacement for the initial object placeholder. As command input is received, objects may be matched or identified according to certain object properties such as CPU utilization, disk space, memory, uptime, version, software type, geographic location, keyword, object tag, or name. In one embodiment, upon determining specific objects for each of the object placeholders in a command suggestion, ECP submits the command for processing execution at one or more machines or systems.

ECP enables a user to quickly search, find, and perform actions on any object within a data processing system infrastructure. ECP may be a standalone management system, may be integrated into other management systems (e.g., an Infrastructure Manager), or may be accessed via an Application Programming Interface (API). In some embodiments, ECP is implemented as a text input area integrated into or accessible from an Infrastructure Manager. An Infrastructure Manager may implement a tree based user interface (e.g., accessible remotely by an administrator's device or locally) to enable a user (e.g., administrator) to navigate multiple nodes or leaves of the infrastructure hierarchy.

In one embodiment, ECP provides a flexible framework for receiving input, interpreting the input as one or more commands, and executing the commands on one or more computer systems. For example, ECP can capture a request with a user interface, suggest one or more actions or objects related to the request, and send a finalized command to an external or remote server for execution on the external or remote server. Commands may include operations to find objects that match specific criteria. Upon selecting the options or objects, a command may be submitted and an action can be performed on the selected objects. For example, a command may include migration of a host with at least 10 days uptime to a host in a different datacenter, where hosts and datacenters are two example objects.

In one embodiment, ECP quickly provides or recommends resource management commands for virtual machines. For example, using default or user-defined rules, ECP can allocate or re-allocate processor and memory resources to a resource or resource pool (e.g., virtual machines running on physical servers). ECP can set minimum, maximum, and proportional resource shares for CPU, memory, disk, and network bandwidth.

In one embodiment, ECP enhances the existing functionality of an Infrastructure Manager to include fast and powerful command interpretation and execution. ECP can be integrated into an Infrastructure Manager's user interface such that a user can perform optimized management commands without losing any current work context within the Infrastructure Manager. For example, a user may be monitoring a system event within an Infrastructure Manager and want to quickly power on a test virtual machine on a host with low processor usage. If the user does not recall the specific full location of a host to accommodate the test virtual machine, the user may navigate an infrastructure tree within the Infrastructure Manager user interface to obtain the system properties (e.g., processor usage) of all available hosts in order to select an appropriate host for the test virtual machine. Upon switching tasks to determining host properties, the user may lose their prior work context of monitoring the system event. However, ECP enables the user to instead quickly call a text input interface (or other representation) within the Infrastructure Manager and query ECP while also maintaining the system event monitoring. For example, ECP can accept an action request to power on a test virtual machine with less than 50% processor usage while maintaining the user's current work context of system event monitoring.

ECP enables experienced users (e.g., senior system administrators) with knowledge of a system, to leverage ECP to quickly find and perform actions upon one or more objects of the data processing system infrastructure. The user may only know approximate or partial properties, attributes, or characteristics of the actions or objects they want to perform. For example, a user may know the name or a partial name of the action and ECP can provide suggestions as to what objects are compatible with the suggested input action. Additionally, the user may provide an approximate location and drill down through hierarchical layers of infrastructure to select an object by name (e.g., starting with the name of a datacenter or host, the user may find a virtual machine within that datacenter or host). In other embodiments, the user may provide an object and ECP can provide compatible actions. For example, a user can type the name of a host and upon determining the host is powered off, ECP may automatically populate a suggestion for "Power on" of the host.

In one embodiment, ECP receives an approximate or incomplete object query and provides the object or a set of objects that match the approximate or incomplete object query. For example, ECP may receive input text that contains the first few letters of an object name, such as "se" and display "server1," "server2," and other similar matches of name as a selectable object.

In one embodiment, ECP receives an action request to determine an object and ECP provides the object or a set of objects that match the action request. For example, ECP may receive input text that contains a request for a host with more than 50% available disk space or a datacenter located in California and return a response best matching the initial action request.

In one embodiment, ECP performs object matching and provides results according to settings within a configuration file. For example, the configuration file may contain predetermined equivalency relationships between general queries or partial requests and actual commands. The configuration file may also contain a detailed account of objects and object categories within a particular infrastructure. In one embodiment, ECP refers to a configuration file with aliases, common misspellings, or alternative names of objects. For example, the misspelled input "srver" may yield a "server" suggestion. ECP may also process wild card requests, such as "Migrate VM* to host4" which ECP may interpret as a migrate action request for all machines with a VM prefix (e.g., VM1 and VM2 but not 1VM or 2VM). In one embodiment, ECP may provide intelligent query translations to translate general queries into predetermined object properties. For example, ECP may receive a query to "Power on all hosts in North America" and interpret the request to pertain to the one or more California hosts known in the system while excluding a host in Tokyo.

In some embodiments, ECP can receive predetermined keywords or shortcuts to select an object in a datacenter. For example, ECP may receive a command to "Migrate VM1 to any available host in datacenter2" and ECP may provide a selectable list of compatible hosts or automatically migrate to a compatible host in datacenter2 that can accept a migration of VM1.

In one embodiment, ECP creates shortcuts or tags for commonly used commands or objects. For example, if a user often checks disk usage on production machines in New York, a user may tag (e.g., with a keyboard shortcut or hashtag or other indicator) a command (e.g., Check disk on production* located in New York #NYCheck). ECP reads tags as user defined shortcuts. Similarly, ECP is able to use tags to perform actions on one or more objects without actually needing to know the names or any other information about those objects. For example, if ten VMs are tagged with "#test" because they are used for quality assurance purposes and a user wants to migrate all quality assurance VMs to a new datacenter or host, the user may enter an ECP command to migrate VMs tagged with #test to Host1. In response, ECP identifies and migrates the ten VMs. As a result, the user does not need to know the names of the VMs, does not need to perform the action ten separate times, and does not need to worry about other VMs with similar names being moved accidentally. In one embodiment, ECP allows the user to specify multiple tags and/or use tags for both inclusion within and exclusion from a particular action. For example, a user command to migrate VMs with #test but not with #NewYork would exclude VM's tagged with both #NewYork from the migration (even if tagged with #test).

In one embodiment, the ECP user interface provides a user with options and suggestions for selecting and performing actions upon various infrastructure objects or components. In one embodiment, ECP provides an integrated search box to quickly and easily perform commands and display command suggestions within the user interface. The integrated search box may be implemented as a pop up window, or as an integrated window embedded into the user interface so that a user can stay within a current context while performing the actions or commands discussed below.

Figure 1:
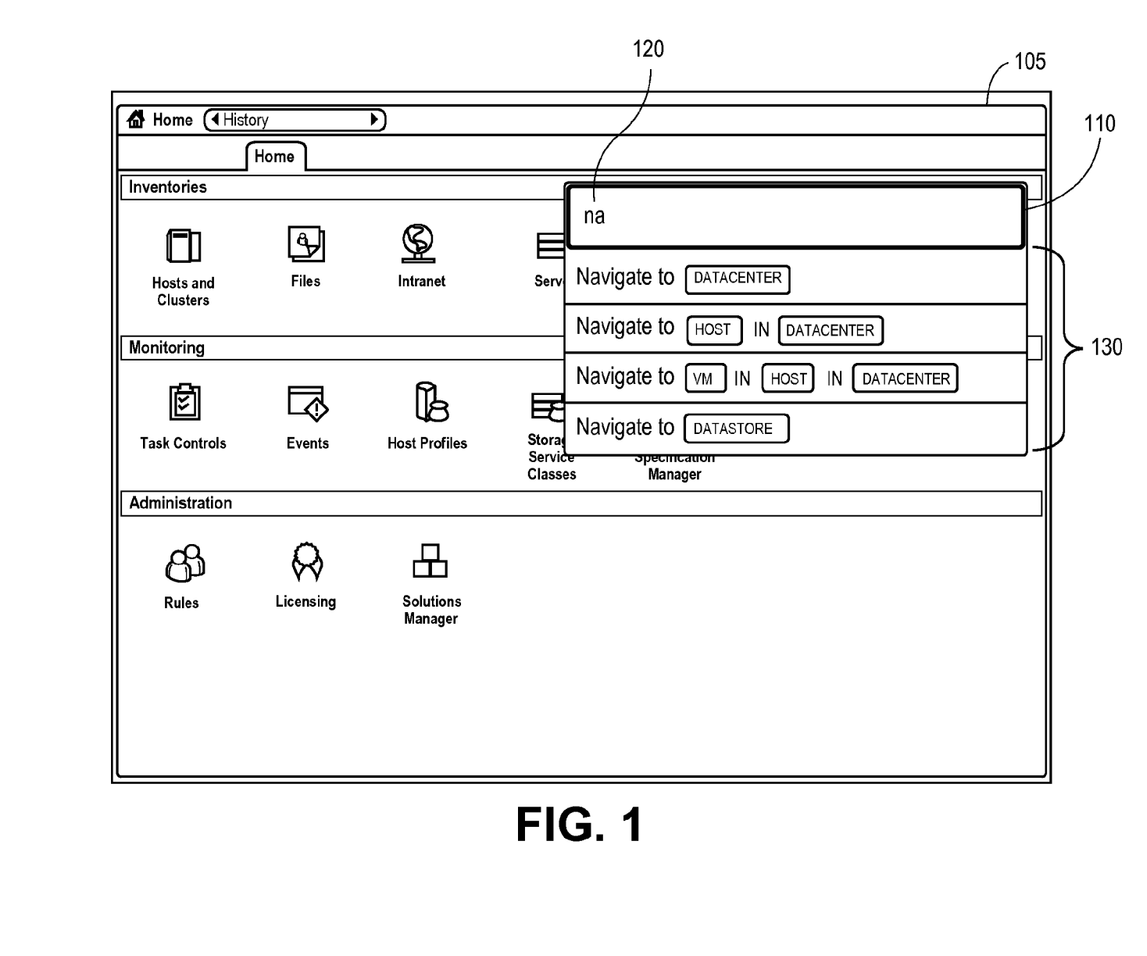
FIG. 1 shows an exemplary Infrastructure Manager with an Efficient Command Processing user interface to interpret an input request.

FIG. 1 shows exemplary Infrastructure Manager with an ECP user interface (ECPUI) 110 receiving and interpreting an input request. In one embodiment, the ECPUI includes or is associated with a program window 105 (e.g., context, or working area) to receive data system management input. Program window 105 is a graphical user interface for an Infrastructure Manager providing a tree-based navigation of components with an infrastructure. User navigation within the Infrastructure Manager user interface may involve first selecting from a set of objects representing a first level of the infrastructure hierarchy in order to navigate to objects at other levels within the infrastructure. At any point in time, some actions or objects may not be directly accessible to a user from the user interface and may be buried beneath one or more menus or interfaces. A user may navigate through layers of menus or other implementations of the interface to be able to access hidden or not immediately accessible actions and objects. For example, navigation to a virtual machine may involve a first route through an Infrastructure Manager user interface tree (from a datacenter to a host device and to the virtual machine). In contrast, a migration of a first host to a second host may involve two or more different routes through the same Infrastructure Manager tree. For example migration may include one route through the Infrastructure Manager user interface to find or select a source host, one route to find or select target host, and possibly another route through the interface to select a migration action request.

ECPUI 110 receives user input such as text input 120 and provides direct access to actions, objects, and a multitude of action and object combinations from any level in an infrastructure hierarchy. In one embodiment, ECPUI 110 is a pop-up box displayed in front of/along with program window 105. Alternatively, ECPUI 110 is embedded within program window 105. In one embodiment, in response to receipt of a partial action request or command (e.g., a letter or first part of a word) ECP expands the user interface (e.g., drop down selections 130) to include command suggestions matching any part of the received input. In one embodiment, the command suggestions in drop down menu 130 (e.g., Navigate to DATACENTER, HOST, etc.) are not displayed as a directly selectable option within the Infrastructure Manager (e.g., datacenter management user interface/outside of drop down menu 130) at the time the user input (e.g., text input 120 or other action request) is received.

In one embodiment, ECP receives input and begins searching for compatible objects matching the received input (e.g., a virtual machine). For example, if a host location is specified, ECP can display all virtual machines at the host location. Upon selecting a specific host, ECP can limit the scope of a match to the specific host.

In the illustrated example in FIG. 1, ECP receives a portion of a word (i.e., "na") as text input 120 within ECPUI 110. Using the partial input, ECP predicts (e.g., by referencing an extensible configuration file as described below) one or more potential commands a user is attempting to perform. For example a user may begin typing "navigate" by starting with the first two letters "na." ECP uses text input 120 to determine (e.g., based on a string match in the configuration file) that the user may be interested in receiving command suggestions related to navigation within a datacenter. For example, ECP may have pre-populated configurations with various object categories related to navigation. ECP can suggest a navigation action and include object placeholders for the target object of the navigation (e.g., via dropdown selections 130). In one embodiment, ECP provides a suggested navigation action request including object category suggestions for the target object (e.g., datacenter, a host in a datacenter, a virtual machine (VM) in a host in a datacenter, a data store, etc.).

In some embodiments, in response to receiving an action request, ECP provides a specific target object suggestion instead of or in addition to an object placeholder suggestion. Specific object suggestions may occur when a single unique object is compatible with the suggested action. For example, if a user has authorized access to manage only one datacenter, and a management command is received, ECP may prepopulate the one compatible datacenter the resulting command suggestion. Specific object suggestions may also occur when ECP determines with a high confidence that a specific object should be suggested based on a user's current context or history. For example, if a user has been working within a specific virtual machine within the Infrastructure Manager or in recent ECP history, the specific virtual machine may be provided instead of or in addition to a general virtual machine object placeholder.

In one embodiment ECP is extensible such that a limitless number of actions and objects may be recognized in forming command suggestions. Some example action requests are:

Power On/Off, Migrate, Enter/Exit Maintenance, Monitor, Create Virtual Machine, Manage Page, and Convert To Template.

As illustrated in FIG. 1, infrastructure objects provided within command suggestions 130 may be general object category placeholders. Placeholders categories such as datacenters, hosts, clusters, virtual machines, and data stores may be distinguished as selectable and editable objects by a selection box or other graphical differentiator. Each object placeholder may be edited to define a specific target object.

Figure 2:
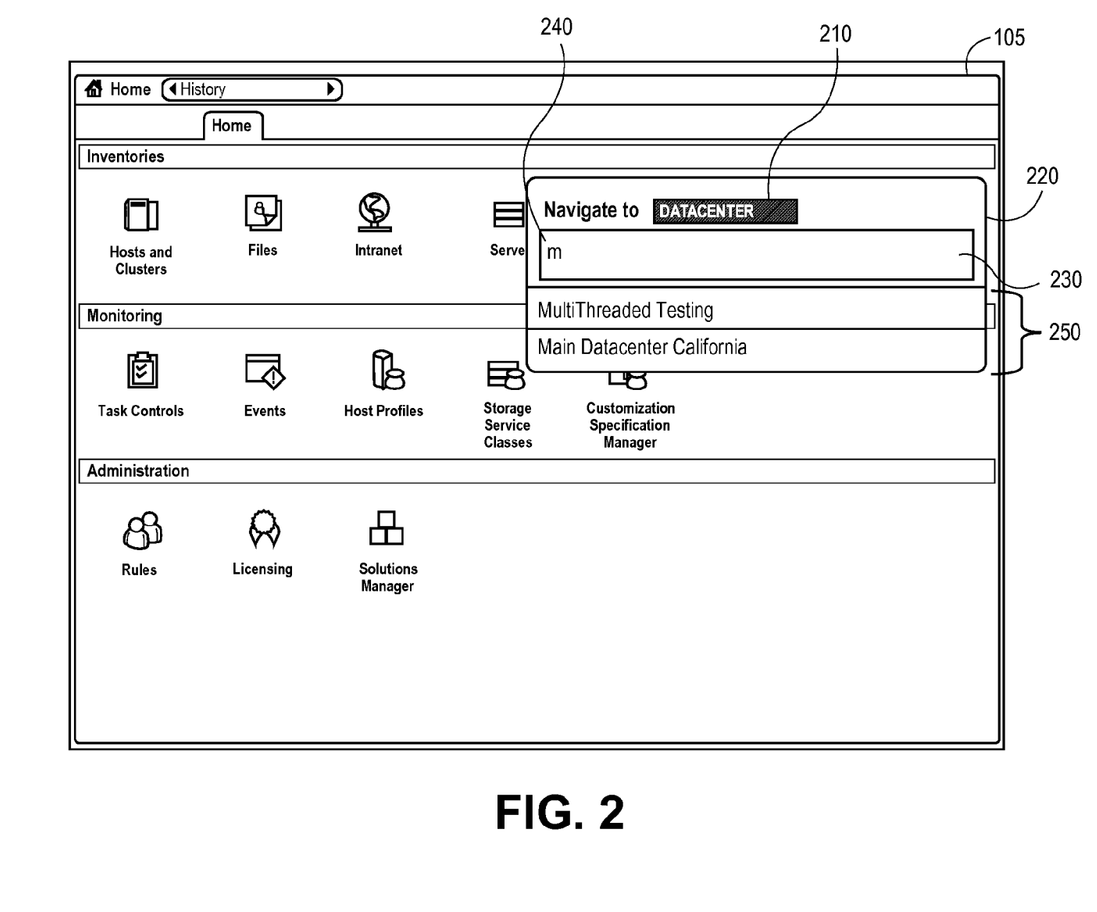
FIG. 2 shows an exemplary Efficient Command Processing user interface to provide compatible object suggestions upon receipt of an object modification input.

FIG. 2 shows exemplary ECP user interface 220 providing compatible object suggestions in response to receipt of an object modification input. In response to selecting "Navigate to DATACENTER" as illustrated in FIG. 1, ECP displays one or more suggested specific target objects 250 associated with the "Navigate" action request. ECP can also accept direct changes to the object category placeholder. For example, in response to a user or default selection of user interface element DATACENTER 210, ECP can automatically prompt for further information to determine which specific datacenter is requested. In some embodiments, specific object suggestions are displayed in drop down menu 250 or other representation in response to the selection (e.g., by a user) of the object placeholder 210. For example, the generic datacenter object placeholder of FIG. 2 is selected (as illustrated by highlighted text) and a user has entered the letter "m." In response, ECP displays two specific compatible datacenters 250. The "Multithreaded Testing" datacenter and "Main Datacenter California" are two datacenters that ECP determines are compatible with the navigate action. ECP displays the two datacenters as recommendations to replace the placeholder DATACENTER 210. In one embodiment, the recommendations in drop down menu 250 (e.g., "Multithreaded Testing" datacenter and "Main Datacenter California") to replace the placeholder (e.g., DATACENTER 210) are not displayed as a directly selectable option within the Infrastructure Manager (e.g., datacenter management user interface/outside of drop down menu 250) at the time the user input (e.g., text input 120, selection of object placeholder 210, and/or specific object selection) is received.

Figure 3:
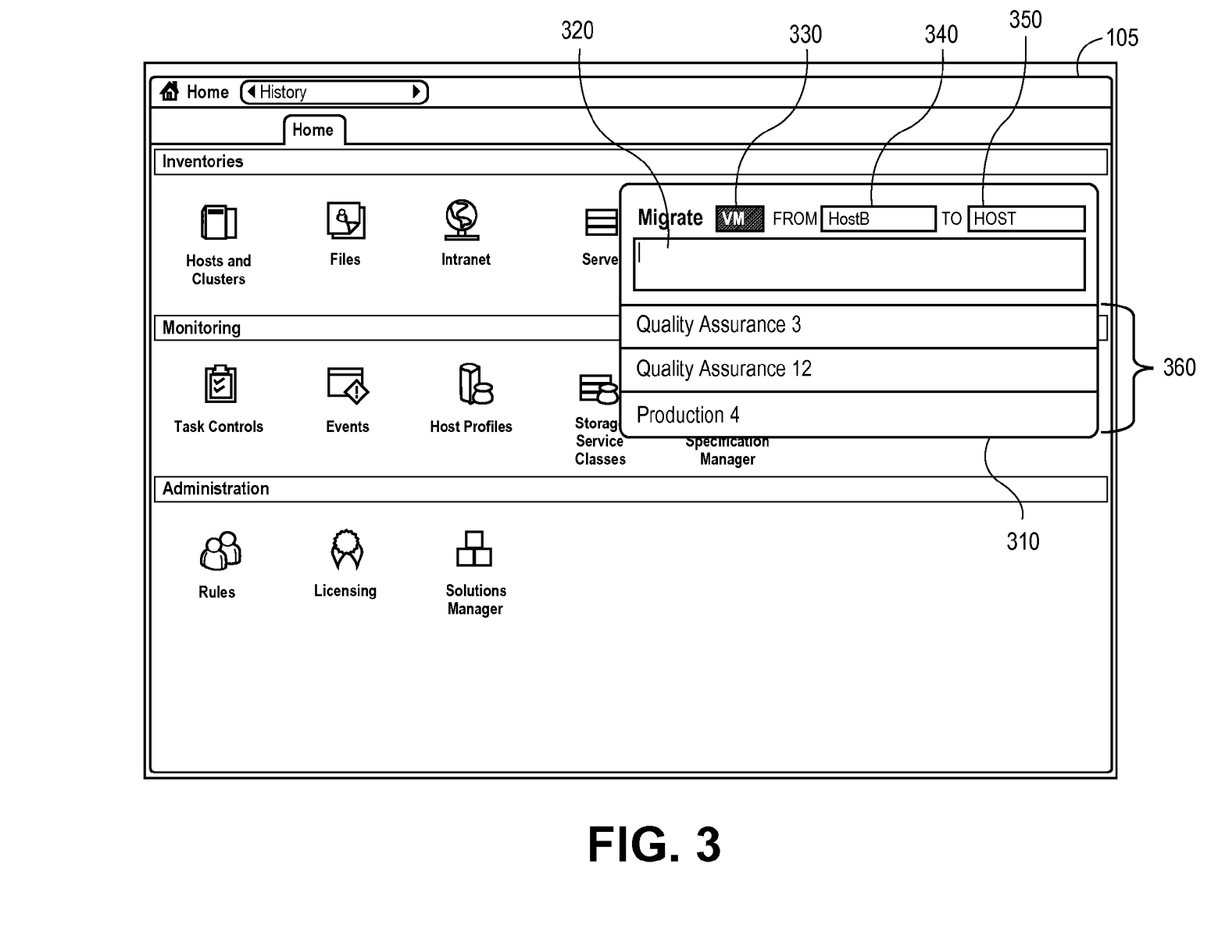
FIG. 3 shows another exemplary Efficient Command Processing user interface to provide compatible object suggestions upon receipt of an object modification input.

FIG. 3 shows exemplary ECP user interface 310 providing compatible object suggestions in response to receipt of an object modification input. As described above, ECP may provide one or more object placeholders to be edited to define a specific target object. In one embodiment, when multiple placeholders are displayed, ECP automatically fills a first placeholder with an object when the object can be determined from user input to define an object for a second placeholder. For example, when migrating a specific VM from a specific host device, a user may enter the specific VM in placeholder VM 330 prior to entering a specific host device. In response, ECP automatically determines and enters the specific host, HostB 340, for the corresponding placeholder.

Alternatively, as illustrated, the user enters a specific host first. ECP displays HostB 340 as a target object from which a VM 330 will be migrated. ECP further displays a target object for a migration destination to be determined, HOST 350. HOST 350 and VM 330 in FIG. 3 represent object placeholders that can receive input specifying a specific target object. VM 330 is highlighted (e.g., in response to being selected by a user) and ECPUI 310 displays three selectable target objects in a drop down menu 360. In one embodiment, the selectable target objects 360 are not displayed as a directly selectable option within the Infrastructure Manager (e.g., datacenter management user interface/outside of drop down menu 360) at the time the user input (e.g., text input 120, selection of object placeholder 330, and/or specifying a specific target object is received. ECP has determined that "Quality Assurance 3," "Quality Assurance 13," and "Production 4" are compatible with the previously selected object HostB 340. As used herein, compatibility refers to the ability of the user to successfully execute a suggested command with the suggested components. Compatibility may be determined by the user's access privileges. For example, UserA may have permissions on machines1-12, while UserB may have permissions on machines 13-24, and ECP can provide object suggestions based on the particular user profile. In one embodiment, ECP determines compatibility based upon stored configuration data or properties assigned to one or more infrastructure components. For example, ECP may reference configuration data for a VM to determine on which host devices the VM may run. Migration of a VM may only be possible when the source and target hosts have similar software versions, a target host has a minimum available disk space, or configuration data for the VM or target host devices dictates that the host(s) are able to run the VM.

In one embodiment, ECP displays suggested objects or actions based on context or history. For example, ECP can determine what a user was working on (i.e., context) prior to or while invoking a command suggestion request. Upon determining context ECP can provide higher result ranking to objects compatible with the determined context. For example, if ECP receives an action request while the user is monitoring a particular production machine or following the user's recent monitoring of the production machine recently, ECP prioritizes the production machine (i.e., by displaying the production machine at the top of a list of recommendations or more prominently than other recommendations). For example, in response to migrating VM1 to machineB, ECP may automatically suggest powering on the VM1. As another example, in response to a user migrating VM1 to machineB, and VM2 to machineB, ECP may automatically suggest a command that includes migrating VM3 to machineB.

In one embodiment, ECP predicts a most likely command or action based on a user's ECP command history or Infrastructure Manager history. For example, ECP can rank objects and actions based on the number of times each respective object or action was selected. ECP may maintain separate user histories for each administrator on a system and provide command suggestions that include objects and actions ranked by frequency of use. For example, in response to a user A's history (e.g., 10 of the last 15 actions) of navigating to machineB, ECP may automatically suggest navigating to machineB.

In one embodiment, ECP displays a select or limited (e.g., "N") number of previously selected actions or objects. For example, if a user requests status update on VMs running in datacenter2 and potential results could include 100 or more results, ECP can provide the top 10 most likely virtual machines to be selected.

Figure 4:
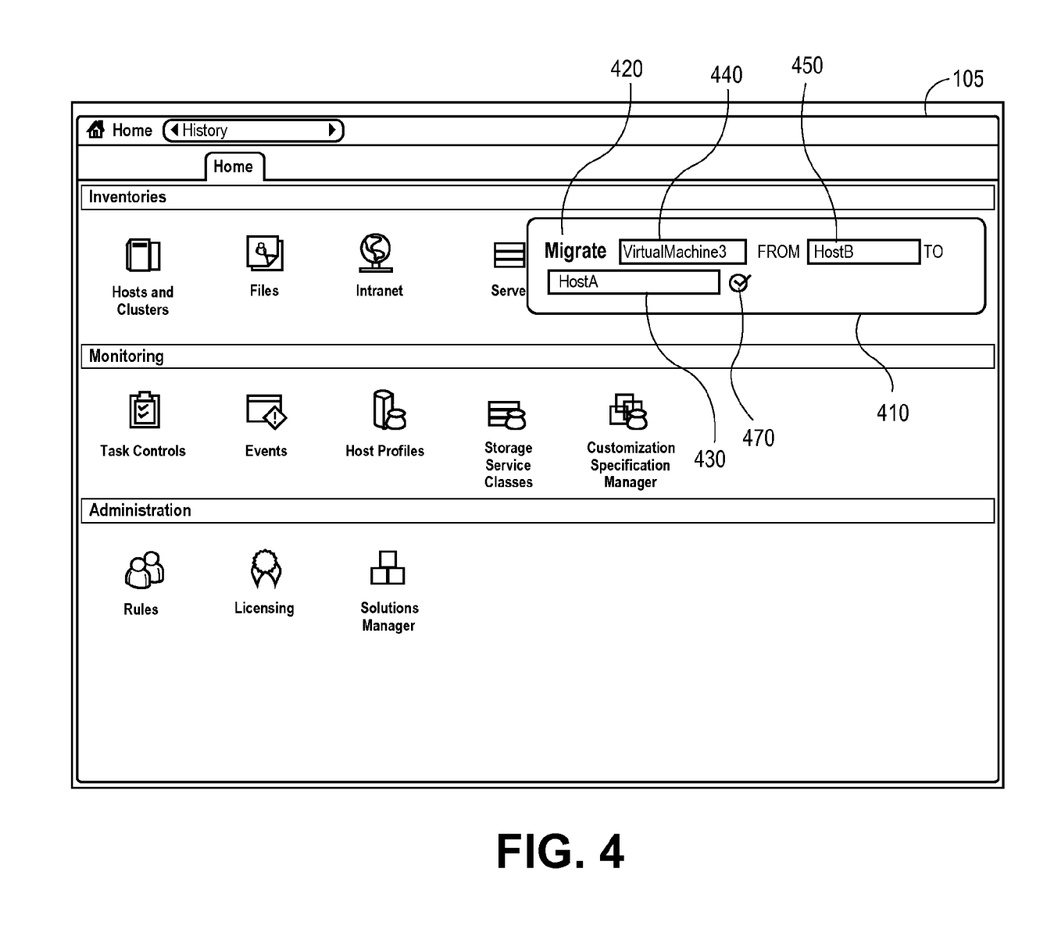
FIG. 4 shows an exemplary Efficient Command Processing user interface with a completed command suggestion and final validation status check.

FIG. 4 shows exemplary ECP user interface 410 with a completed command suggestion and final validation status check. In one embodiment, ECP provides a final check (pre-submission) for compatibility with all entered actions and objects. Instead of submitting a command and receiving an error, ECP can verify before command submission whether the command is likely to succeed. If the command is not likely to succeed, ECP provides the user an opportunity to modify the command within ECPUI 410. Alternatively, ECP provides the user with an alternate option. For example, if a first host is not compatible for a particular VM, ECP presents a second host as a recommendation and enables the user to choose between proceeding with the first host and modifying the command to use the second host.

After each object and action within a command has been selected, ECP can verify the selected command would be acceptable/feasible for execution. For example, in response to a selection to migrate 420 VirtualMachine3 440 from HostB 450 to HostA 430, ECP determines whether HostA 430 has the necessary disk space, system compatibility, or other potential recommended or required characteristics before initiating the migration. In response to determining the selected combination of objects and actions would not be possible or is likely to produce an error, ECP returns or displays an error message or other indication within the user interface.

In one embodiment, ECP provides an indication of the final check status within the ECP user interface. For example, a color indicator within the user interface may display yellow in a graphic element while a command is being checked, green when the command passes a check, and red when a check has failed. In the exemplary illustration of FIG. 4, ECPUI 410 displays final check success graphic (e.g., check mark 470, thumbs up, or other indicator). Alternatively, a final check failure may be represented to highlight potential problems with the command suggestion. For example, ECPUI 410 can display a pop up with details on any error found, or may simply provide a selectable graphical indicator (e.g., exclamation mark, thumbs down, or other indicator) that can trigger detailed error information (e.g., "not enough free CPU available for migration").

In one embodiment, ECP prompts a user for a multi-stage or multi-step command finalization before submitting a command for processing at a server. The multi-stage command finalization may be requested from a user when ECP determines a command may cause irreversible or serious alterations to a system if erroneously applied. Commands with a high possibility of damaging a server or causing downtime may be determined within a configuration file. In response to determining a high likelihood that a command is a high-risk command, ECP enables the multi-stage or multi-step command finalization. In one embodiment, command finalization can include two or more key combinations to enter a command. For example, to finalize the command the user would press the CTRL key and the Enter key together in a combined two key trigger (as compared to pressing the Enter key alone for a command determined not to be high-risk). Other combinations or hurdles may be implemented to distinguish high-risk commands from standard commands. For example, ECP may request re-entry of credentials before authorizing certain commands, or prompt the user with a pop up box to verify the user's intent to proceed with the high-risk command execution. In some embodiments, ECP passes along (e.g., submit to a respective server for processing) relatively harmless or innocuous commands (e.g., navigating to an object, or requesting status of an object) without any safety mechanism.

In other embodiments, ECP is implemented with a text only, audio, or motion based user interface. Instead of or in addition to providing graphic presentation of selectable objects as shown in FIGS. 1-4, ECP can provide a text only or command line interface with similar functionality. For example, Actions and objects within the text-based interface (e.g., a command line text only interface) may be organized with text delimiters such as a column, semicolon, colon, and parenthesis. ECP as described herein may be also be implemented with motion (e.g., hand gestures, eye tracking, or other forms of user feedback) or audio (e.g., a microphone may receive and interpret user voice input). Additionally, while FIGS. 1-4 illustrate commands in structured language and formats, in an alternate embodiment, ECP utilizes natural language processing to interpret one or more command parameters.

Figure 5:
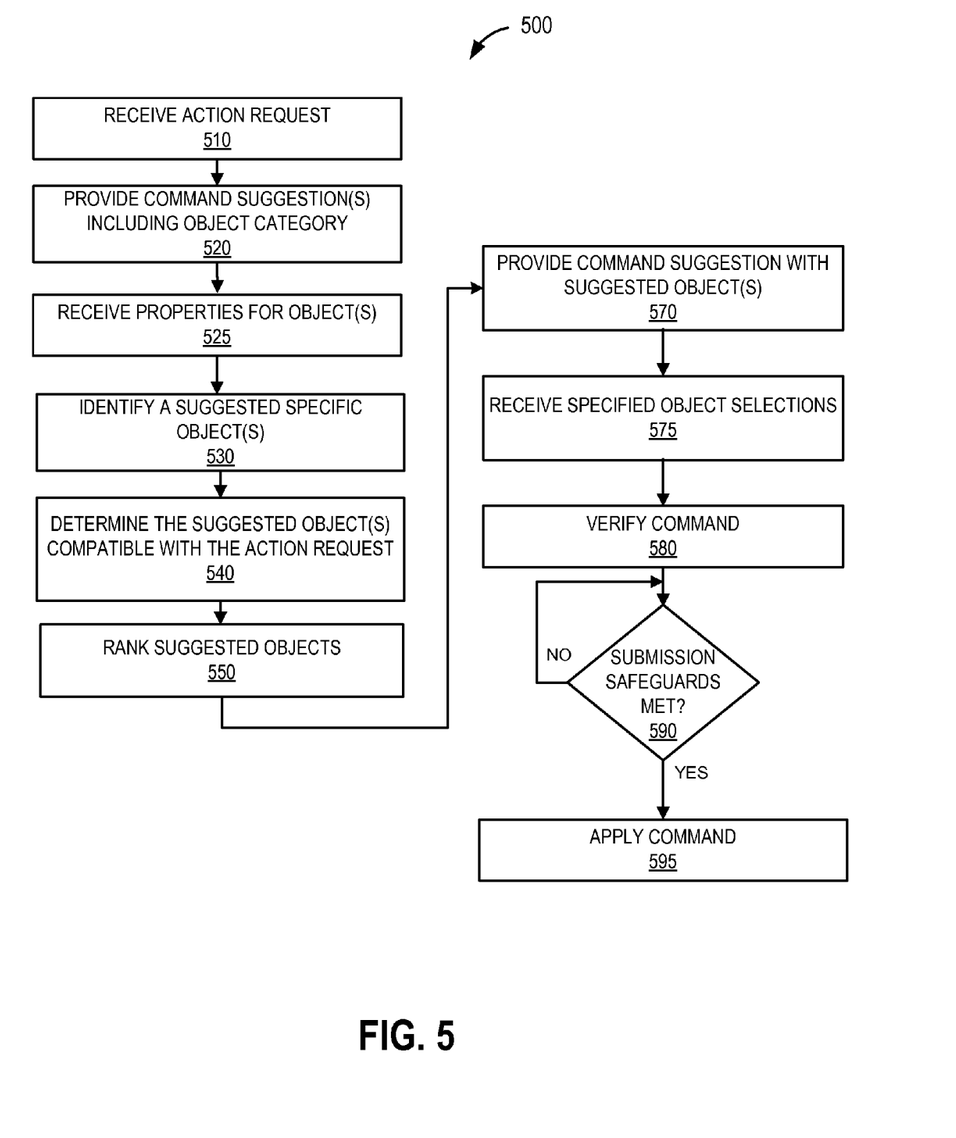
FIG. 5 is a flow chart illustrating an exemplary method of Efficient Command Processing.

FIG. 5 is a flow chart illustrating an exemplary method of efficient command processing. At block 510, the embodiment (e.g., ECP) receives an action request. An action request may include a command to execute within an infrastructure as described above. For example, ECP may receive a text input requesting a "power on" action request for an object in a datacenter. In another example, ECP may receive a partial action request "m" and ECP can provide two different action request suggestions. The first suggested action could be a "migrate" action request for a virtual machine to a datacenter. The second suggested action could be a "maintenance mode" action request for a host. An action request may also include requests related to identifying an object within the infrastructure. For example, ECP may receive input to identify a host with at least 10 days continuous uptime or a virtual machine running a specific operating system version. In one embodiment, the received action request may be a combination of two or more actions. For example, the request may include a request to "migrate a virtual machine located in California to a host with at least 50% free disk space."

At block 520, the embodiment provides one or more command suggestions including an object category (or specific object). For example, in response to receiving a selection of one or more action requests above (e.g., text input), ECP provides object categories associated with the requests. Object categories may be a placeholder for an object suggestion. For example, in response to receiving a "navigate" action request, ECP displays a command suggestion "navigate to host" and "navigate to datacenter." In this previous example, "host" and "datacenter" are placeholder object categories that have a number of specific objects (e.g., hostA, or Main Datacenter—California). Each object category may have a set of specific objects that are optionally ranked under the respective category. Specific objects are the unique virtual or physical components of an infrastructure. In one embodiment, specific objects may be provided along with or instead of placeholder object categories. For example, one or more specific objects may be displayed based upon a user's current context, history, suggestion confidence threshold, etc. In one embodiment, the placeholder object suggestions are not displayed as a directly selectable option within the Infrastructure Manager (e.g., datacenter management user interface) at the time ECP receives the action request in block 510.

Action requests may have one or more objects as input. For example, ECP may suggest a command to migrate a first object (e.g., a virtual machine) from a second object (e.g., source host) in a third object (e.g., source datacenter) to a fourth object (e.g., target host) in a fifth object (target datacenter). Additionally, as illustrated in FIG. 1, ECP may suggest a single object or multiple objects for a "navigate" action.

At block 525, the embodiment receives one or more object properties as input. For example, ECP can receive a portion of a target object's properties to provide unique object suggestions as a replacement for the initial object placeholder. Objects properties may include CPU utilization, disk space, memory, uptime, version, software type, geographic location, keyword, or name.

At block 530, the embodiment identifies one or more suggested specific objects. For example, ECP utilizes an object category and/or one or more object properties to identify specific target objects. ECP searches known objects for a match to the object category and/or property in order to return one or more matches. The specific target objects may be unique identifiable objects within the infrastructure.

At block 540, the embodiment determines the suggested objects are compatible with the received action request. For example, if the received action request is migrate, the embodiment determines if the suggested objects can be migrated.

At block 550, the embodiment optionally ranks suggested objects. ECP may provide multiple suggested objects when a received object property identifies more than one suggested object. To rank objects, ECP can look at statistically which prior suggestions have been selected by a user and rank objects according to the frequency of accesses or selections. ECP can also determine the current or recent context of the user and rank objects according to context. For example, if a user is working on a particular virtual machine within the datacenter management user interface, the virtual machine can be prioritized when a command suggestion is requested. Additionally, ranking may be based upon priorities assigned to objects, storage or processing utilization, geography, performance ratings, etc.

At block 570, the embodiment provides a command suggestion with one or more suggested object(s). For example, in response to identifying a suggested object and verifying the suggested object is compatible with the action request, ECP displays a command suggestion including the suggested object.

At block 575, the embodiment receives specific object selections. For example, in response to ECP providing one or more selectable specific objects for each object placeholder, a user may select a combination of the suggested action and specific object(s). The selected combination of suggested objects and the selected action request forms a final command for verification and processing within the infrastructure. Instead of, or in addition to one or more suggested objects or actions, a user may enter a specific object or action. For example, a user may input "migrate VM3 to HostC" and submit the command for execution without ECP providing any suggestions or without selecting a suggestion provided by ECP. In some embodiments, ECP may receive user entries of objects or actions that were not suggested, or were not within the universe of objects or actions known to ECP (e.g., not within the current configuration file). In response to discovering new objects or actions for suggestion, ECP can update a configuration file to include the entered objects for future suggestions. In one embodiment, ECP may receive a mix of selected ECP suggestions and user entries. For example, ECP may suggest Migration of VM4 from HostD to HostE and the user can, without selecting a suggestion, input HostF as the source host.

At block 580, the embodiment verifies the selected command suggestion. In some embodiments, after every object suggestion or action suggestion is confirmed (e.g., by receiving user selection of the suggestion or by other indications of confirmation) ECP provides an additional compatibility check. As described above, some user input may be a manual entry and may not be a selection from a predetermined suggested object. Therefore ECP may not have had a chance to verify the likelihood that each object is compatible with the action request and that the final command will be successful. The additional compatibility check may include other checks not previously performed when the suggested object was initially identified or selected. For example, upon providing a suggested command to migrate VM1 to hostB, ECP may check whether the migration is feasible by verifying the network is capable of migrating between the source and destination, and whether the source has disk space, memory, and CPU availability to perform or maintain the additional virtual machine. The other or additional checks may not have been included in the initial compatibility checks in order for ECP to provide suggestions quickly with low system usage or reduced user wait time.

At block 590, the embodiment determines if any safeguard exists and whether the safeguard is met. ECP may request multiple key inputs before submitting irreversible or potentially damaging changes to the infrastructure. In some embodiments, ECP may require specified predetermined verification safeguards (e.g., pressing CTRL and enter) to submit a command. If required, and the safeguards are not received, ECP does not send a command to the infrastructure. If no safeguard is required, ECP accepts any standard entry method (e.g., a single enter keystroke) to receive a command for processing in the infrastructure.

At block 595, if submission safeguard(s) are met or not required, the embodiment applies the command suggestion. If applicable to the command, ECP sends the command suggestion to a respective server for processing and application to the infrastructure. In some embodiments, ECP can apply the command suggestion without one or more of: ranking suggested objects 570, performing a final verification 580, safeguards 590.

In one embodiment, ECP is extensible and enables users to provide new or updated configuration file to enable customized matching of actions and objects to received input. The configuration file may be XML, a flat text file, or other implementation. ECP may read configuration data including various recognized objects or actions. In some embodiments, ECP performs a string match to the entries in the configuration file when providing suggestions (e.g., with names).

One or more Application Programming Interfaces (APIs) may be used in some embodiments. An API is an interface implemented by ECP that allows a different program code component or hardware component (i.e., an interfacing program) to access and use one or more functions, methods, procedures, data structures, classes, and/or other services provided by ECP. An API can define one or more parameters that are passed between the API-calling component and the interfacing program.

Figure 6:
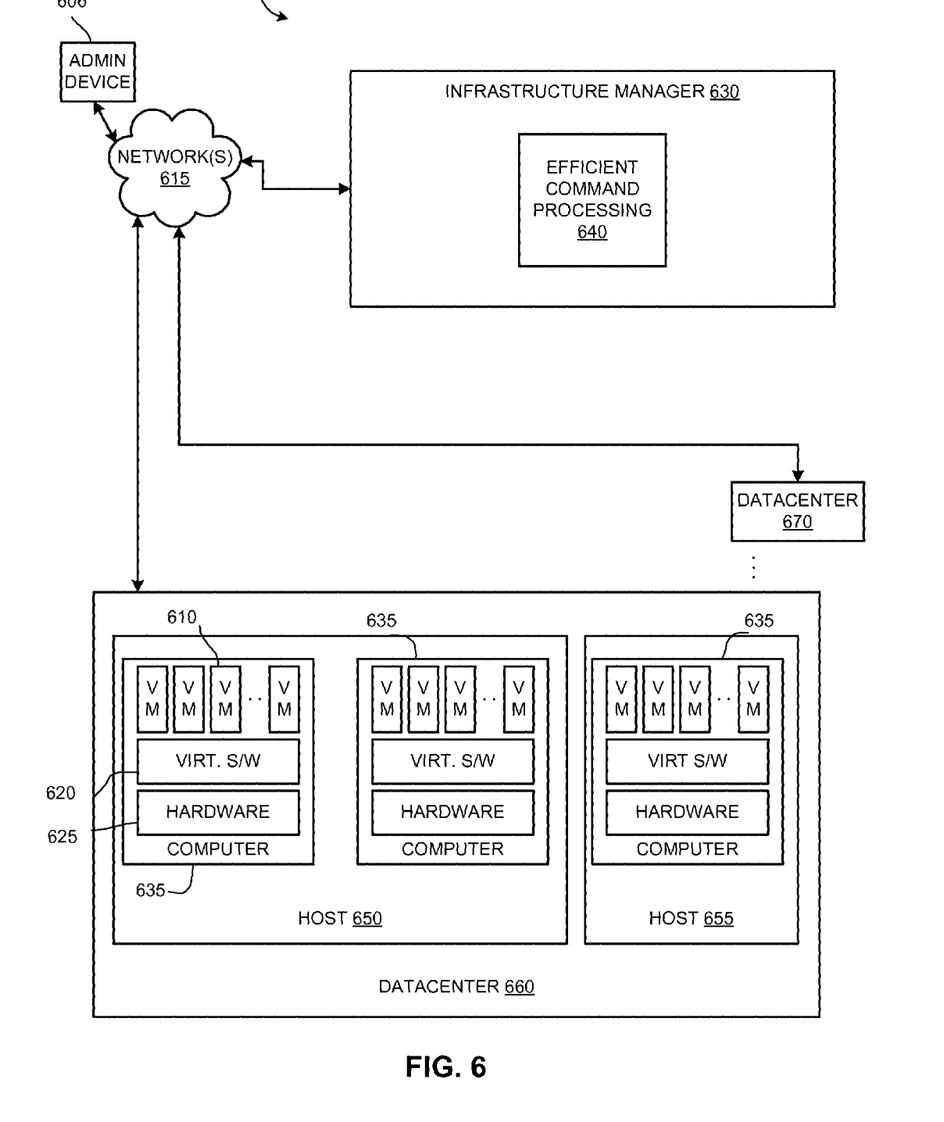
FIG. 6 illustrates, in block diagram form, an exemplary system and network environment including one or more networked processing devices implementing Efficient Command Processing.

FIG. 6 illustrates, in block diagram form, an exemplary system and network environment including one or more networked processing devices implementing efficient command processing. Infrastructure Manager 630 may include management software to orchestrate the provisioning of software defined datacenter services. Exemplary services include virtualized computing, networking, storage, and security services that implement the infrastructure of one or more datacenters 660 and 670. Additionally, Infrastructure Manager 630 utilizes ECP 640 to expedite the provisioning and maintenance of said infrastructure.

Infrastructure Manager 630 can provide a remotely accessible user interface to administrator device 606 to manage the configuration of services within a datacenter (e.g., datacenters 660 and 670). For example, the ECM allows administrator device 606 to perform a plurality of features or functions as described above with regard to ECP. In one embodiment, administrative console 660 exports a graphical user interface via hypertext transfer protocol (HTTP) to be accessed by a web browser. Alternatively, a command-line interface or a rich client is provided to administrator device 606, which includes a web browser to access the administrative console. Infrastructure manager 630 allows administrator device 606 to perform a plurality, of functions, such as: cloning VM's, define VM state policies, setup custom messages to be sent to users (e.g., when the desktops are put into maintenance mode for weekly patches, hotfixes, etc.), set storage overcommit settings for different data stores used by desktop pools, perform rebalance operations on a set of virtual desktops, and other similar operations. Additionally, Infrastructure Manager 630 supports operations for the discovery of compute, storage, and network resources; creation of logical compute pools by providing features such as automatic CPU and memory load balancing; provisioning/creation of one or more virtual disks, on local or shared storage-clones with full or sparse disks; creation of cloned VM's; and power operations on virtual machines (power on, power-off, suspend, resume, checkpoint, etc.), configuring firewall and other networking/security services, adding servers, isolating multi-tenant organizations, creating datacenter service templates, defining role-based access, monitoring processor, memory, and storage usage/allocation, pooling resources, and other similar operations. While illustrated as a component of the Infrastructure Manager 630, in one embodiment, ECP may be implemented in a separate component or other networked processing device.

Server-based computing in a virtual datacenter environment allows an administrator device 606 to access centrally-managed user virtual desktops or other datacenter services, such as those implemented by VM's 610, via network(s) 615 (e.g., a local area network or other private or publically accessible wide area network, such as the Internet).

The term "desktop," as used herein, refers to a human interface environment through which users can launch, interact with, and manage applications, settings, and/or data, etc. A virtual desktop is a virtual computing system that operates as a desktop or workstation computer with which an end user can interact using a desktop remoting protocol and the software and/or hardware of a client device.

VM's 610 are complete computation environments, containing virtual equivalents of the hardware and system software components of a physical system and are typically implemented by an extensive virtualization infrastructure, which includes a variety of software and hardware components. A virtualization software layer 620 (e.g., a hypervisor) running on hardware 625 of physical computer 635 manages one or more VM's 610. Virtualization software layer 620 manages physical resources, e.g., hardware 625, as well as maintains virtual-to-physical hardware mappings. In some embodiments, ECP 640 submits commands through network 610 for execution by the software layer 620. Infrastructure manager 630 may be a physical computer system or a virtual machine that runs managers ent software.

Figure 7:
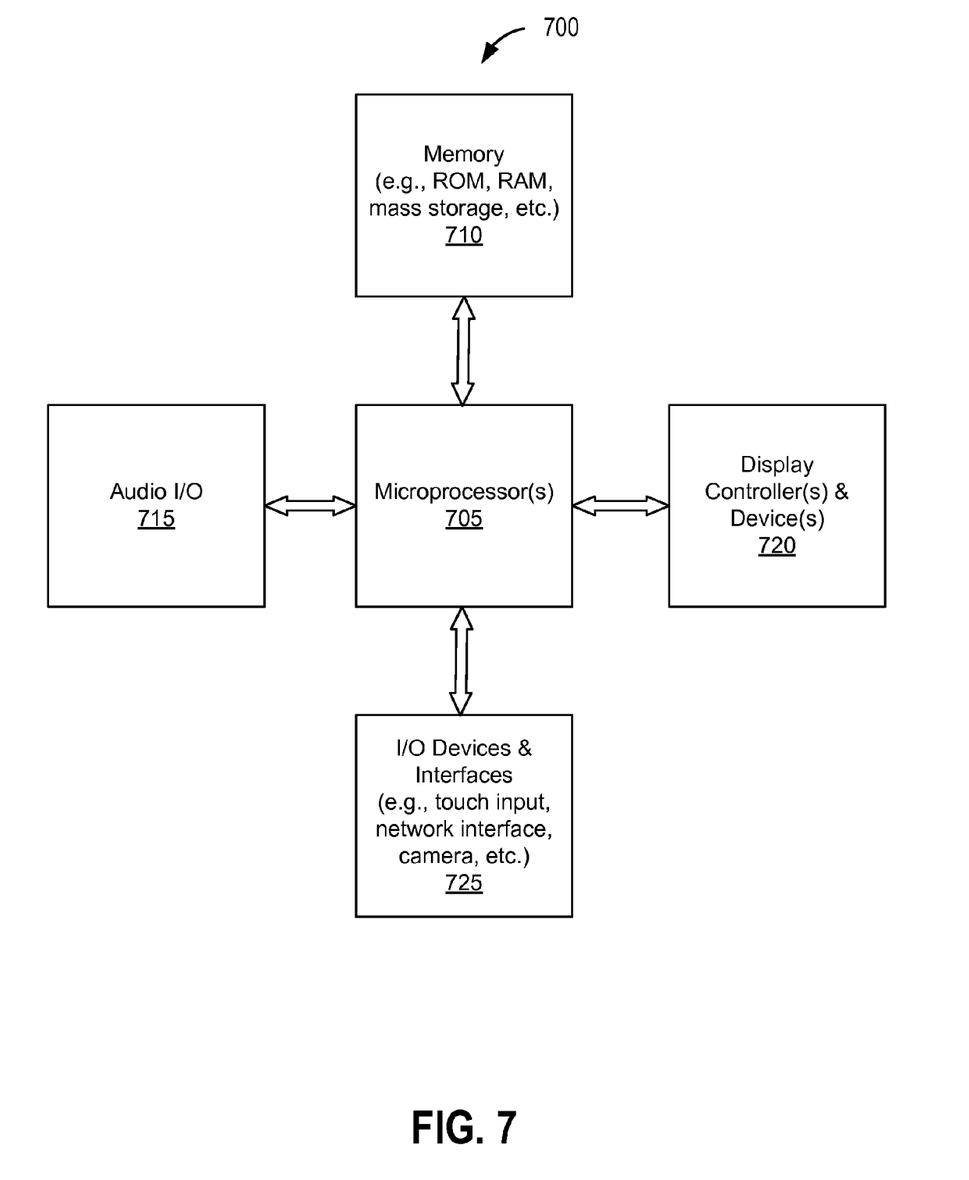
FIG. 7 illustrates, in block diagram form, an exemplary data processing system to implement Efficient Command Processing.

FIG. 7 illustrates, in block diagram form, an exemplary processing system 700 to perform ECP as described above. Data processing system 700 includes one or more microprocessors 705 and connected system components (e.g., multiple connected chips). Alternatively, data processing system 700 is a system on a chip.

Data processing system 700 includes memory 710, which is coupled to microprocessor(s) 705. Memory 710 may be used for storing data, metadata, and programs for execution by microprocessor(s) 705. Memory 710 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 710 may be internal or distributed memory.

Data processing system 700 also includes an audio input/output subsystem 715 which may include a microphone and/or a speaker for, for example, playing back music or other audio, receiving voice instructions to be executed by microprocessor(s) 705, playing audio notifications, etc. Display controller and display device 720 provides a visual user interface for the user.

Data processing system 700 also includes one or more input or output ("I/O") devices and interfaces 725, which are provided to allow a user to provide input to, receive output from, and otherwise transfer data to and from data processing system 700. I/O devices 725 may include a mouse, keypad or a keyboard, a touch panel or a multi-touch input panel, camera, optical scanner, network interface, modem, other known I/O devices or a combination of such I/O devices.

I/O devices and interfaces 725 may also include a port, connector for a dock, or a connector for a USB interface, FireWire, Thunderbolt, Ethernet, Fibre Channel, etc. to connect system 700 with another device, external component, or a network. Exemplary I/O devices and interfaces 725 also include wireless transceivers, such as an I3 802.11 transceiver, an infrared transceiver, a Bluetooth transceiver, a wireless cellular telephony transceiver (e.g., 2G, 3G, 4G, etc.), or another wireless protocol to connect data processing system 700 with another device, external component, or a network and receive stored instructions, data, tokens, etc. One or more buses, may be used to interconnect the various components shown in FIG. 7.

Data processing system 700 is an exemplary representation of one or more of administrator device 606, Infrastructure Manager 630, and host device(s) 635 described above. Data processing system 700 may be a personal computer, tablet-style device, a personal digital assistant (PDA), a cellular telephone with PDA-like functionality, a Wi-Fi based telephone, a handheld computer which includes a cellular telephone, a media player, an entertainment system, or devices which combine aspects or functions of these devices, such as a media player combined with a PDA and a cellular telephone in one device. In other embodiments, data processing system 700 may be a network computer, server, or an embedded processing device within another device or consumer electronic product. As used herein, the terms computer, device, system, processing system, processing device, and "apparatus comprising a processing device" may be used interchangeably with data processing system 700 and include the above-listed exemplary embodiments.

Additional components, not shown, may also be part of system 700, and, in certain embodiments, fewer components than that shown in FIG. 7 may also be used in data processing system 700. It will be apparent from this description that aspects of the inventions may be embodied, at least in part, in software. That is, the computer-implemented method 500 may be carried out in a computer system or other data processing system 700 in response to its processor or processing system 705 executing sequences of instructions contained in a memory, such as memory 710 or other non-transitory machine-readable storage medium. The software may further be transmitted or received over a network (not shown) via a network interface device 725. In various embodiments, hard-wired circuitry may be used in combination with the software instructions to implement the present embodiments. Thus, the techniques are not limited to any specific combination of hardware circuitry and software, or to any particular source for the instructions executed by the data processing system 700.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of non-transitory machine-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

It will be evident that various modifications may be made thereto without departing from the broader spirit and scope of the invention as set forth in the following claims. For example, the methods described herein may be performed with fewer or more features/blocks or the features/blocks may be performed in differing orders. Additionally, the methods described herein may be repeated or performed in parallel with one another or in parallel with different instances of the same or similar methods.

What is claimed is:

1. A computer-implemented method for:
   receiving, within a datacenter management user interface, an action request to perform an action;
   determining, in response to receiving the action request, a first suggested object compatible with the action request, wherein the first suggested object is a datacenter or a component within the datacenter, wherein the component may be physical or virtual, and wherein the first suggested object is not displayed as a directly selectable option within the datacenter management user interface when the action request is received; and
   providing, in response to determining the first suggested object compatible with the action request, a first command suggestion within the datacenter management user interface, wherein the first command suggestion comprises the first suggested object.

2. The method of claim 1, wherein the first suggested object is determined to be compatible with the action request based upon one or more of: user permission to perform the action request on the first suggested object, and configuration data or properties assigned to the first suggested object or another object.

3. The method of claim 1, further comprising:
   providing, before determining the first suggested object, a second command suggestion within the datacenter management user interface, wherein the second command suggestion comprises a placeholder object category.

4. The method of claim 1, further comprising:
   receiving an object property used to identify the first suggested object; and
   identifying the first suggested object according to the object property.

5. The method of claim 4, wherein the object property is one or more of: CPU utilization, disk space, memory, uptime, version, software type, or geographic location.

6. The method of claim 1, further comprising:
   providing a second suggested object within the datacenter management user interface, wherein the second suggested object is compatible with one or more of the first suggested object, and the action request.

7. The method of claim 1, further comprising:
   determining a second suggested object is compatible with the action request and ranking the first and second suggested objects based on one or more of:
   frequency of accesses to each respective object within the datacenter management user interface, and
   current user context within the datacenter management user interface.

8. The method of claim 1, further comprising:
   verifying the feasibility of performing a combination of one or more command suggestions before submitting the command combination.

9. The method of claim 1, wherein the first suggested command has a predetermined verification safeguard enabled before applying suggested commands to a datacenter or datacenter component.

10. The method of claim 1, wherein the action request is a text input and the datacenter management user interface is a command line text based user interface, and wherein the command line text based user interface receives input to receive and edit each suggested object independently.

11. A non-transitory computer-readable medium storing instructions, which when executed by a processing device, cause the processing device to perform method comprising:
    receiving, within a datacenter management user interface, an action request to perform an action;
    determining, in response to receiving the action request, a first suggested object compatible with the action request, wherein the first suggested object is a datacenter or a component within the datacenter, wherein the component may be physical or virtual, and wherein the first suggested object is not displayed as a directly selectable option within the datacenter management user interface when the action request is received; and
    providing, in response to determining the first suggested object compatible with the action request, a first command suggestion within the datacenter management user interface, wherein the first command suggestion comprises the first suggested object.

12. The medium of claim 11, wherein the first suggested object is determined to be compatible with the action request based upon one or more of: user permission to perform the action request on the first suggested object, and configuration data or properties assigned to the first suggested object or another object.

13. The medium of claim 11, the method further comprising:
    providing, before determining the first suggested object, a second command suggestion within the datacenter management user interface, wherein the second command suggestion comprises a placeholder object category.

14. The medium of claim 11, the method further comprising:
    receiving an object property used to identify the first suggested object; and
    identifying the first suggested object according to the object property.

15. The medium of claim 14, wherein the object property is one or more of: CPU utilization, disk space, memory, uptime, version, software type, or geographic location.

16. The medium of claim 11, the method further comprising:

providing a second suggested object within the datacenter management user interface, wherein the second suggested object is compatible with one or more of the first suggested object, and the action request.

17. The medium of claim 11, the method further comprising determining a second suggested object is compatible with the action request and ranking the first and second suggested objects based on one or more of:

frequency of accesses to each respective object within the datacenter management user interface, and current user context within the datacenter management user interface.

18. The medium of claim 11, the method further comprising:

verifying the feasibility of performing a combination of one or more command suggestions before submitting the command combination.

19. The medium of claim 11, wherein the action request is a text input and the datacenter management user interface is a command line text based user interface, and wherein the command line text based user interface receives input to receive and edit each suggested object independently.

20. An apparatus comprising:

a processing device, wherein the processing device executes instructions that cause the apparatus to:

receive, within a datacenter management user interface, an action request to perform an action;

provide, before determining the first suggested object, a first command suggestion within the datacenter management user interface, wherein the first command suggestion comprises a placeholder object category;

identify a first suggested object according to a received object property and the action request, wherein the object property is one or more of: CPU utilization, disk space, memory, uptime, version, software type, geographic location, keyword, or name;

determine, in response to receiving the action request, the first suggested object is compatible with the action request, wherein the first suggested object is a datacenter or a component within the datacenter, wherein the component may be physical or virtual, and wherein the first suggested object is not displayed as a directly selectable option within the datacenter management user interface when the action request is received; and provide, in response to identifying the first suggested object is compatible with the received object property and the action request, a second command suggestion within the datacenter management user interface, wherein the second command suggestion comprises the first suggested object.

* * * * *